(12) United States Patent
Sugiyama

(10) Patent No.: US 7,849,341 B2
(45) Date of Patent: Dec. 7, 2010

(54) INFORMATION PROCESSING APPARATUS, INFORMATION PROCESSING METHOD, PROGRAM, AND STORAGE MEDIUM

(75) Inventor: Hideki Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 11/688,435

(22) Filed: Mar. 20, 2007

(65) Prior Publication Data

US 2007/0260337 A1    Nov. 8, 2007

(30) Foreign Application Priority Data

Apr. 12, 2006  (JP)  ............... 2006-110100
Mar. 15, 2007  (JP)  ............... 2007-067597

(51) Int. Cl.
*G06F 15/00*    (2006.01)
*B41J 29/38*    (2006.01)

(52) U.S. Cl. ............... 713/323; 713/300; 713/310; 713/320; 713/321; 713/322; 713/324; 358/1.13; 358/1.14; 358/1.15; 399/70

(58) Field of Classification Search ............... 713/300, 713/310, 320–324; 358/1.13, 1.14, 1.15; 399/70

See application file for complete search history.

(56) References Cited

U.S. PATENT DOCUMENTS

2007/0097424 A1*  5/2007  Mizuno ............... 358/1.15
2008/0229132 A1*  9/2008  Suga et al. ............... 713/324

FOREIGN PATENT DOCUMENTS

JP    2001-180083    7/2001

* cited by examiner

*Primary Examiner*—Abdelmoniem Elamin
(74) *Attorney, Agent, or Firm*—Cowan, Liebowitz & Latman, P.C.

(57) ABSTRACT

An information processing apparatus which can communicate with a printing apparatus that operates in the first electric power state in which electric power necessary for a status response to an external request is supplied and the second electric power state in which no necessary electric power is supplied includes an acquisition unit which acquires a shift notice from the first electric power state to the second electric power state that is transmitted from the printing apparatus, and a control unit which hastens access to the printing apparatus on the basis of the shift notice acquired by the acquisition unit.

10 Claims, 17 Drawing Sheets

F I G. 11B

| | CURRENT PROCESS TIME | NEXT PROCESS TIME | SCHEDULED SLEEP SHIFT TIME | PROCESS REPETITION INTERVAL | SCHEDULED SLEEP SHIFT TIME − FIXED TIME |
|---|---|---|---|---|---|
| SPECIFYING PROCESS 1 | t0 | t2 | ta | TT | tt2 |
| SPECIFYING PROCESS 2 | t0 | t4 | tb | TTb | tt4 |
| ..... | | | | | |

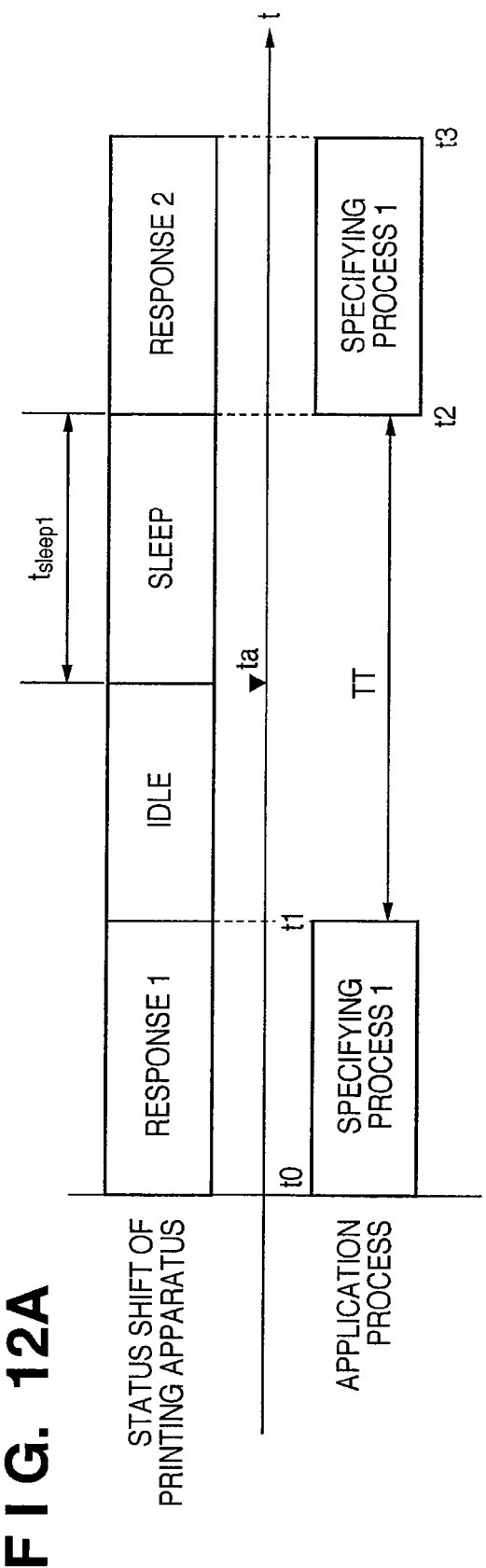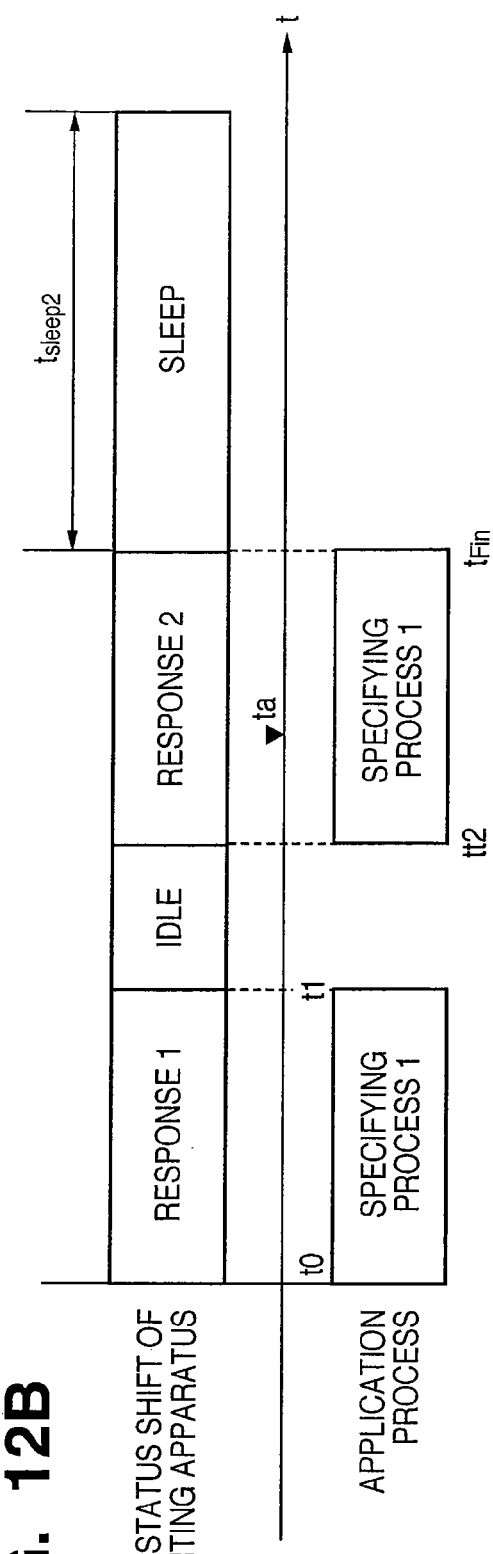

F I G. 13B

| SPECIFYING PROCESS | CURRENT PROCESS TIME | NEXT PROCESS END TIME | SCHEDULED SLEEP SHIFT TIME | PROCESS REPETITION INTERVAL | SCHEDULED SLEEP SHIFT TIME - (FIXED TIME + EXECUTION TIME OF APPLICATION) |
|---|---|---|---|---|---|
| SPECIFYING PROCESS 1 | t0 | t3 | ta | TT | tt3 |
| SPECIFYING PROCESS 2 | t0 | t5 | tb | TTb | tt5 |
| ...... | | | | | |

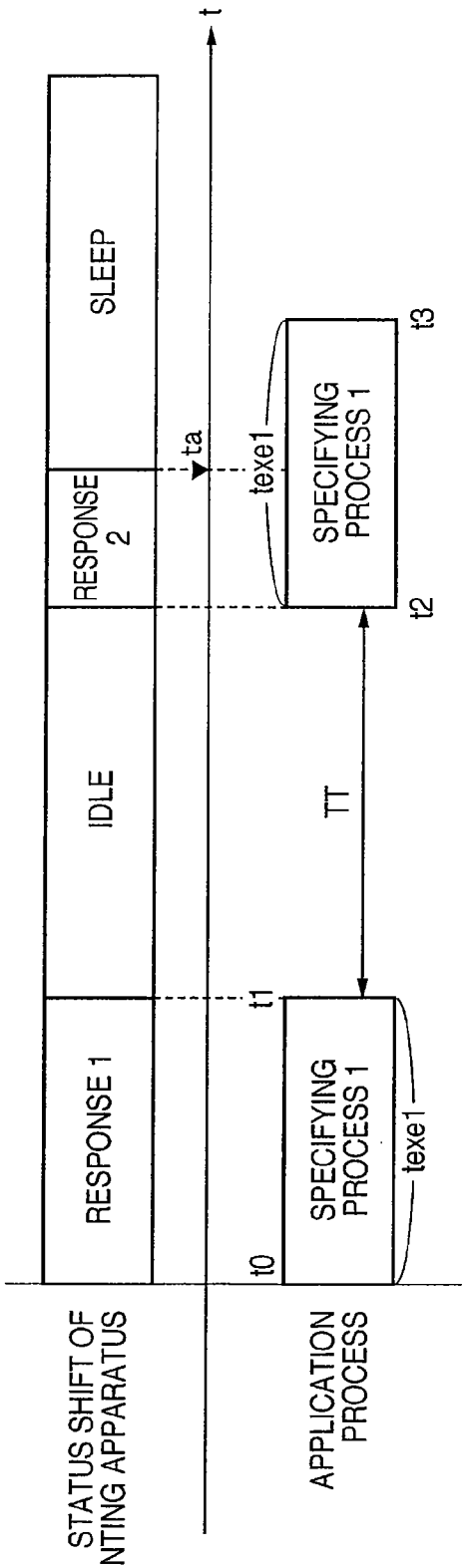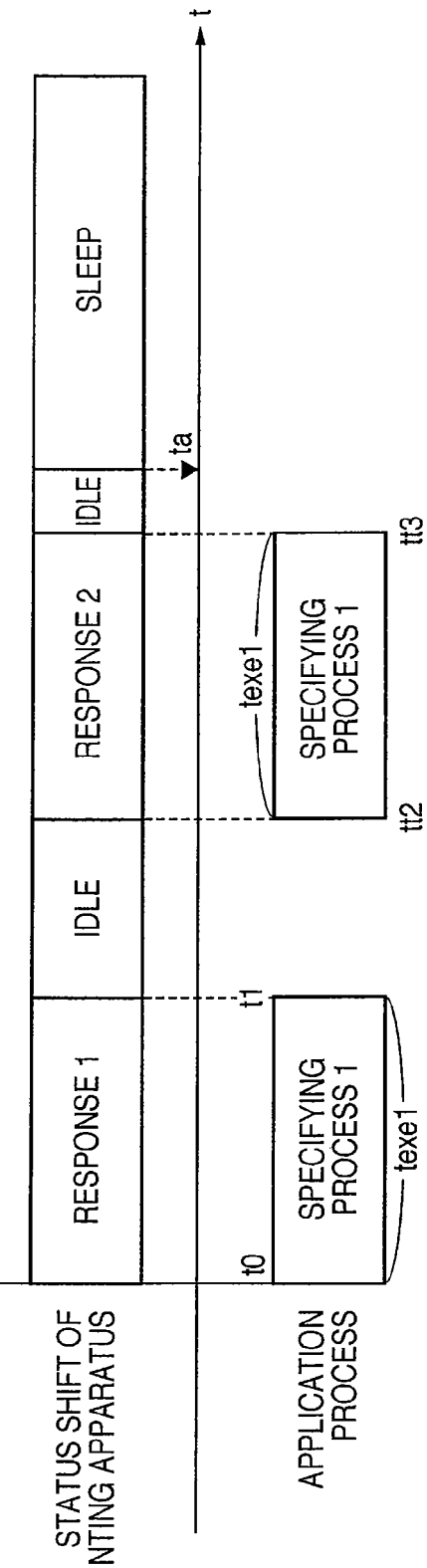

INFORMATION PROCESSING APPARATUS, INFORMATION PROCESSING METHOD, PROGRAM, AND STORAGE MEDIUM

BACKGROUND OF THE INVENTION

1. Field of the Invention

The present invention relates to an information processing technique of controlling access to a printing apparatus by an information processing apparatus capable of communicating with the printing apparatus.

2. Description of the Related Art

To meet the demand for electric power saving, recent printing apparatuses have an electric power saving mode in which the electric power consumption is reduced by stopping some functions when determining that the printing apparatus has been standing still for a long time, in addition to an operating mode in which the printing apparatus executes a print operation. When a host computer accesses a printing apparatus in the electric power saving mode, the printing apparatus changes from the electric power saving mode to the operating mode to resume stopped functions and respond to a request from the host computer.

For example, Japanese Patent Laid-Open No. 2001-180083 discloses a printing apparatus capable of controlling the printing apparatus main body and also the CPU and RAM associated with communication control with a host computer or the like to shift to the electric power saving mode.

FIG. 14 is a timing chart showing the relationship between the shift of a conventional printing apparatus to the operating mode and the process of an application. The upper side of the abscissa axis indicating the lapse of time t represents the status shift timing of the printing apparatus, and the lower side represents the timing of the application process. The application performs process 1 (e.g., an inquiry about the amount of remaining sheets to the printing apparatus, or a print instruction) during the interval between time t0 and time t1.

While running in the first operating mode, the printing apparatus replies to an inquiry or instruction from the application (response 1). From time t1 when the application completes process 1, the application does not access the printing apparatus until the next process.

Since the printing apparatus is not accessed, it enters the electric power saving mode (sleep mode) serving as the second operating mode at time ta after a predetermined period through an idle state in which the printing apparatus does nothing.

Upon the lapse of a predetermined polling period TT of the application, the application performs process 2 from time t2 to time t3. Upon access from the application, the printing apparatus shifts from the sleep mode to the normal operating mode, and replies to a request from the application (response 2).

At this time, no problem occurs when the polling period TT is sufficiently long (e.g., 5 h). However, if the host computer frequently accesses the printing apparatus in the electric power saving mode, the printing apparatus shifts from the electric power saving mode to the operating mode, failing to reduce electric power consumption. For example, when the printing apparatus and its hard disk shift to the sleep mode once at time ta and then the hard disk starts up, this shortens the service life of the hard disk. Frequent OFF/ON operation shortens the service life of the hard disk. To prevent this, the hard disk must remain ON for a predetermined time after the hard disk in the sleep mode (OFF) shifts to the operating mode (ON). That is, electric power necessary to operate the hard disk must be supplied for a predetermined time, and the hard disk cannot shift to the sleep mode during this period. To ensure the electric power saving state of the printing apparatus, communication may be cut off to completely inhibit access from the host computer to the printing apparatus for a while. In this case, however, the host computer cannot acquire necessary information about the printing apparatus, impairing the functions of the system made up of the host computer and printing apparatus.

SUMMARY OF THE INVENTION

The present invention has been made to overcome the conventional drawbacks, and has as its object to provide a technique capable of saving electric power without greatly impairing the functions of a printing system.

According to the present invention, the foregoing object is attained by providing an information processing apparatus which can communicate with a printing apparatus that operates in a first electric power state in which electric power necessary for a status response to an external request is supplied and a second electric power state in which no necessary electric power is supplied for the status response to the external request is supplied, and which accesses the printing apparatus on the basis of a preset timing in order to cause the printing apparatus to perform a process, comprising:

an acquisition unit adapted to acquire a shift notice representing that the printing apparatus is due to shift from the first electric power state to the second electric power state and being transmitted from the printing apparatus; and a control unit adapted to access the printing apparatus by setting a timing of access to the printing apparatus earlier than the preset timing on the basis of the shift notice acquired by the acquisition unit.

The present invention can provide a technique capable of maintaining the idle state of a communication unit associated with communication control for a long time and saving electric power without greatly impairing the functions of the system.

Further features of the present invention will become apparent from the following description of exemplary embodiments (with reference to the attached drawings).

BRIEF DESCRIPTION OF THE DRAWINGS

FIG. 11B is a table illustrating a state in which a RAM or the like saves various times corresponding to processes (specifying processes 1, 2, . . . );

FIGS. 12A and 12B are timing charts for explaining timings when changing next process time t2 based on the process in FIG. 11A;

FIG. 13B is a table illustrating a state in which the RAM or the like saves various times corresponding to processes (specifying processes 1, 2, . . . );

FIGS. 13C-1 and 13C-2 are timing charts for explaining timings when changing next process end timing t3 based on the process in FIG. 13A.

DESCRIPTION OF THE EMBODIMENTS

First Embodiment

Figure 1:
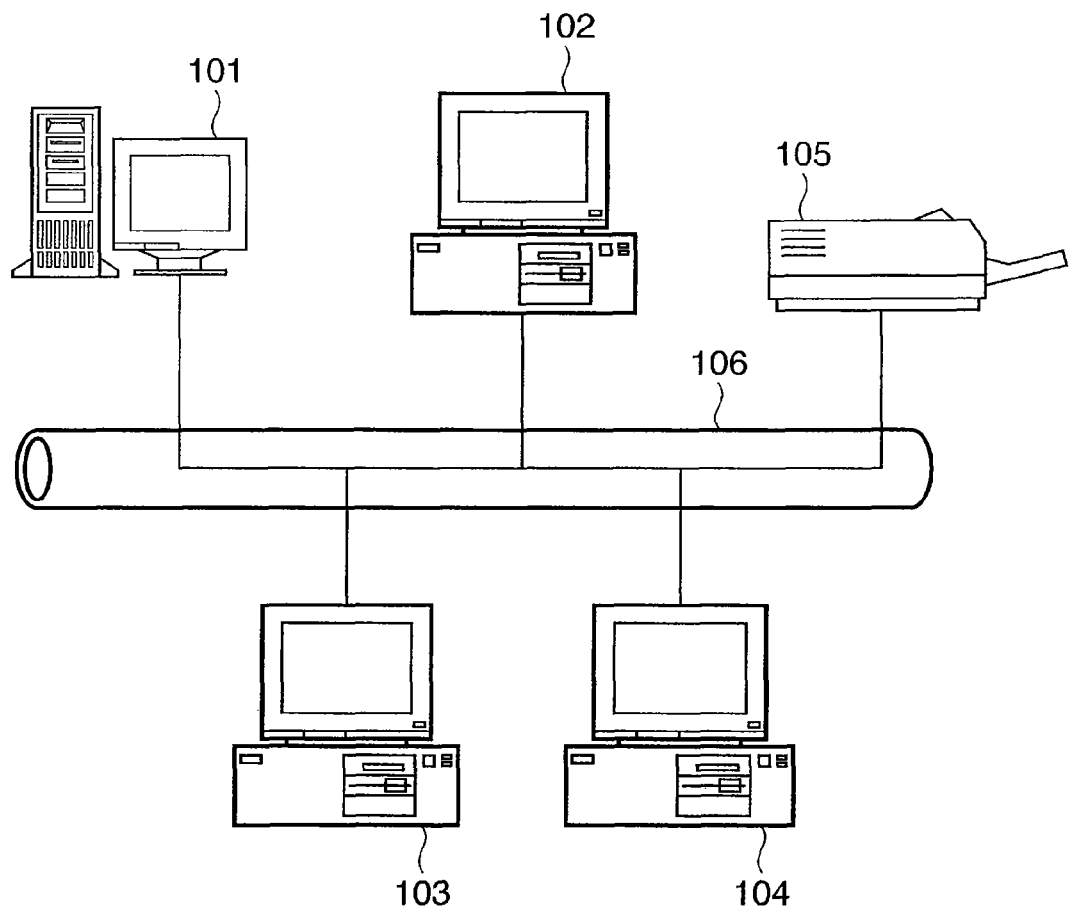
FIG. 1 is a block diagram showing the configuration of a printing system according to an embodiment of the present invention.

The first embodiment of the present invention will be described below with reference to the accompanying drawings. FIG. 1 is a block diagram showing the configuration of a printing system according to the first embodiment of the present invention. A printing apparatus 105 and information processing apparatuses 101 to 104 are connected to a network 106 via network cables such as Ethernet®. The information processing apparatuses 101 to 104 each incorporate a printer driver having a function of converting print data into a printer language corresponding to the printing apparatus. The information processing apparatuses 101 to 104 comprise a communication device capable of communicating with another apparatus connected to the network 106 in two ways.

The printing apparatus 105 may be a laser beam printer adopting the electrophotographic method, an inkjet printer adopting the inkjet method, or a printer adopting the thermal transfer method. The printing system can also be built as a multi-function peripheral having the scanner function.

In the printing system, the information processing apparatus 101 (to be referred to as a "print server" hereinafter) can store files used in the printing system, and monitor the use state of the network 106. The print server 101 can communicate with other information processing apparatuses (to be referred to as "clients" hereinafter) and the printing apparatus 105 which are connected to the network 106 via the communication device, and manage the operating state of each apparatus.

The clients 102 to 104 and the print server 101 can be formed from general information processing apparatuses. The print server 101 can also have the functions of the clients 102 to 104.

The print server 101 stores print jobs containing print data whose print requests are issued from the clients 102, 103, and 104, and manages execution of the print jobs. The print server 101 receives only print data-free job information from the clients 102 to 104, and manages the print order of the clients 102, 103, and 104. The print server 101 can notify a client whose turn for printing has come, or of permission to transmit a print data-containing print job. The print server 101 can acquire the status of the printing apparatus 105 and various types of information of the print job, and notify the clients 102 to 104 of them.

The printing apparatus 105 can receive a print data-containing print job from the clients 102 to 104. The printing apparatus 105 can analyze the contents of each print job, convert each page into a dot image, and print out each page.

Figure 2:
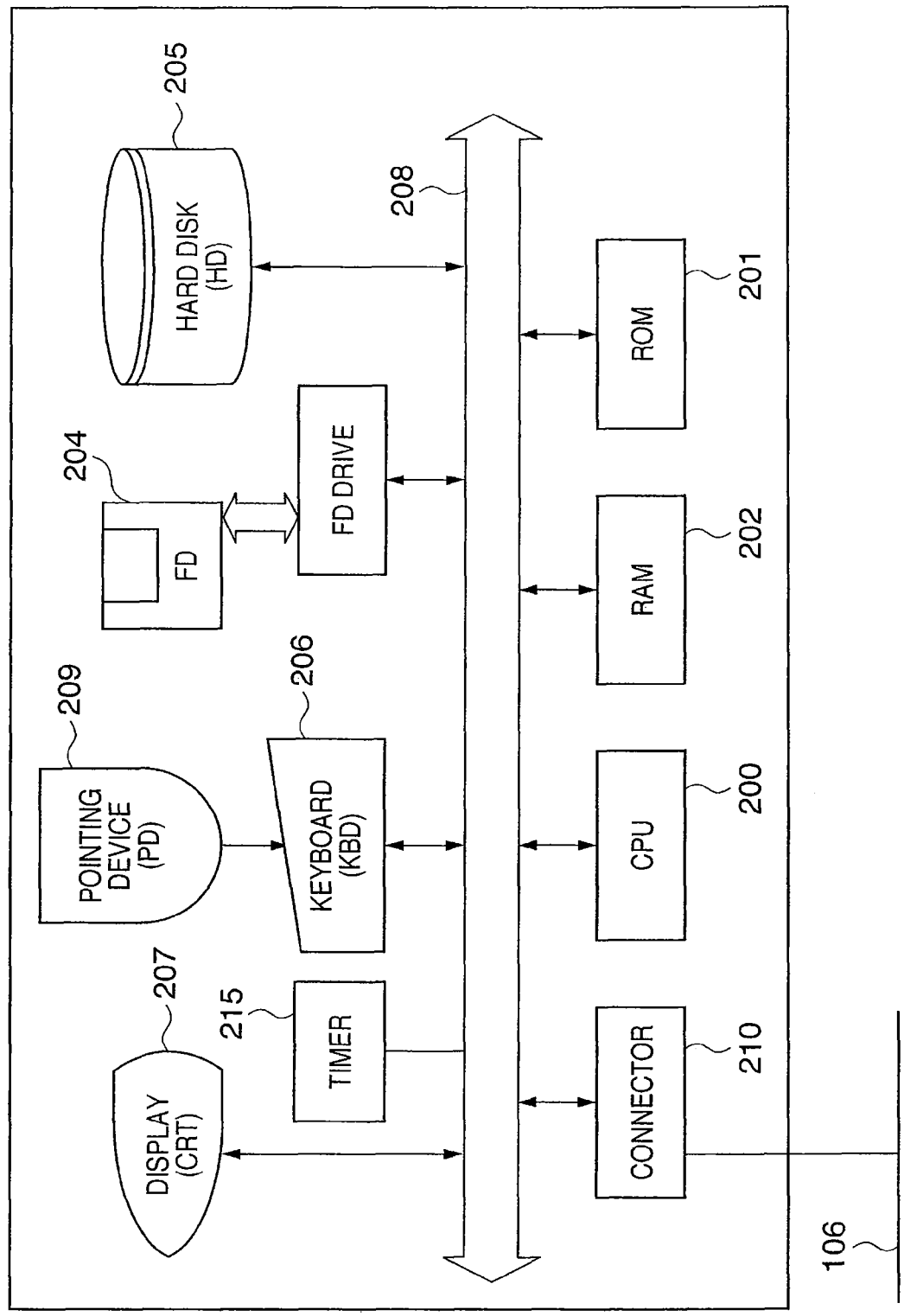
FIG. 2 is a block diagram showing the arrangement of an information processing apparatus according to the embodiment of the present invention.

FIG. 2 is a block diagram showing the arrangement of the information processing apparatus (print server 101 and clients 102 to 104). In FIG. 2, reference numeral 200 denotes a CPU functioning as a control unit for managing the overall control. The CPU 200 executes application programs, printer driver programs, an OS, the control program (print control program) of the printing apparatus according to the embodiment, and the like which are stored in a hard disk (HD) 205. When executing various programs, the CPU 200 temporarily stores, in a RAM 202, information, files, and the like necessary to execute the programs.

Reference numeral 201 denotes a ROM serving as a storage unit which stores programs such as a basic I/O program, and various data such as font data and template data used for a document process. The RAM 202 serving as a temporary storage unit functions as a main memory, work area, and the like for the CPU 200.

Reference numeral 203 denotes a flexile disk (FD) drive serving as a storage medium loading unit. A program and the like stored in a flexible disk (FD) 204 serving as a storage medium are loadable via the FD drive 203 into the computer system serving as a client. The storage medium is not limited to the FD, and may be a CD-ROM, CD-R, CD-RW, PC card, DVD, IC memory card, MO, memory stick, or the like.

The FD 204 stores a program readable by a computer. The hard disk (HD) 205 is one of external storage units and functions as a large-capacity memory. The HD 205 stores application programs, printer driver programs, an OS, a print control program, related programs, and the like. The HD 205 further stores a spooler. The spooler serves as a client spooler in the client 102, 103, or 104, and a server spooler in the print server 101. In the print server 101, the HD 205 also stores a table generated to store job information received from the clients 102 to 104 and control the order of jobs.

Reference numeral 206 denotes a keyboard (instruction input unit) which allows a user to input a device control command instruction and the like to the client and an operator or administrator to input them to the printer server. Reference numeral 207 denotes a display which displays a command input from the keyboard 206, the printer status, and the like. Reference numeral 208 denotes a system bus which manages a data flow in the computer such as the print server 101 or the client 102, 103, or 104. Reference numeral 209 denotes an interface (input/output unit). The print server 101 and the clients 102 to 104 can exchange data with an external apparatus via the interface 209.

Reference numeral 215 denotes a timer which measures the current time. The CPU 200 can control the application execution timing (start or end of execution) based on a measurement of the current time by the timer 215. This time represents the time when the process is executed. The base point may be a time point, lapse time from another time, or the like.

The first embodiment exemplifies a case in which the print control program and related data are directly loaded from the FD 204 to the RAM 202 and executed. Alternatively, every time the print control program installed in the HD 205 is to run, it may be loaded into the RAM 202. It is also possible to store the print control program in the ROM 201, form it into part of the memory map, and directly execute it by the CPU 200.

The medium which stores the print control program may be a CD-ROM, CD-R, PC card, DVD, IC memory card, or the like, in addition to the FD.

The detailed arrangement of the printing apparatus 105 will be explained.

Figure 3:
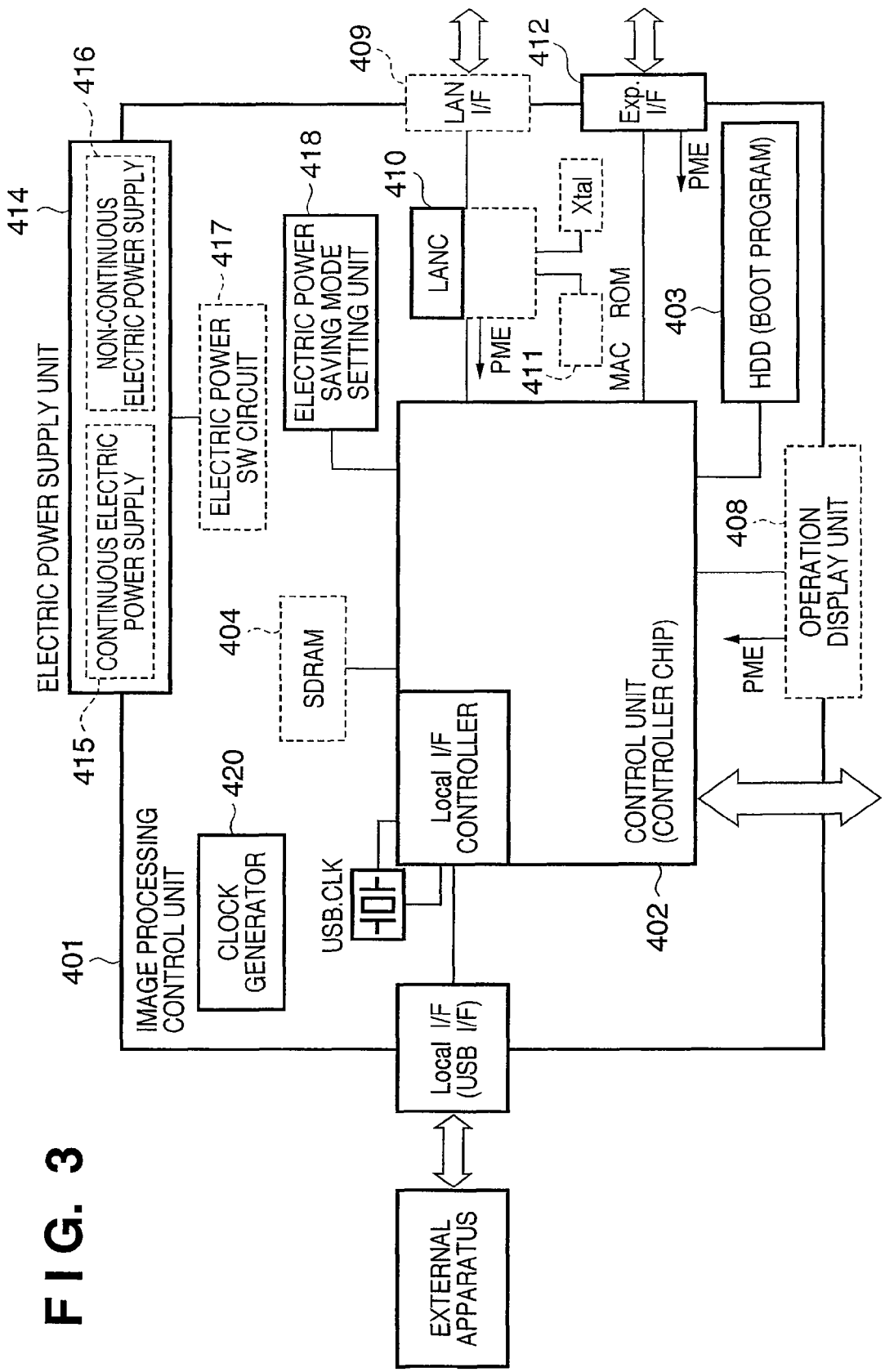
FIG. 3 is a block diagram showing the hardware configuration of a controller unit which implements the functions of the printing apparatus according to the embodiment of the present invention.

FIG. 3 is a block diagram showing the hardware configuration of a controller unit which implements the functions of the printing apparatus 105. The printing apparatus 105 according to the first embodiment can return electric power supply even in a deep sleep state (to be described later) so as to respond to various requests from an external apparatus.

In FIG. 3, an image processing control unit 401 corresponds to the controller of the printing apparatus 105, and comprises a 1-chip control unit (controller chip) 402.

The control unit 402 has the I/F of the ROM which stores various programs, the I/F of the RAM (including a DRAM), the PCI bus I/F, and the video I/F. The control unit 402 comprises hardware for expanding a print description language transferred from any external apparatus, an ASIC including functions of compressing and decompressing various data, and the like.

The control unit 402 also has a function of performing an image process for print data received from an external apparatus via a network and LAN controller (LANC) 410, and a function of receiving data via the LAN controller 410 and processing it.

A hard disk (HDD) 403 is a nonvolatile storage medium which keeps holding data even when the main electric power is OFF. The hard disk 403 stores an initialization program for each part of the image processing control unit 401, and initial setting values (parameters) associated with an image process, communication, display, and the like. The hard disk 403 stores programs which define various operations such as an image process, communication, and display, a boot program for activating the printer, and the like. In the first embodiment, data which are stored in the hard disk 403 in association with initialization will also be referred to as initialization data or setting data.

When the main electric power switch of the printing apparatus 105 is turned on, execution of the boot program stored in the hard disk 403 starts. Then, each part of the image processing control unit 401 including the control unit 402 loads an initialization program, initial setting values (parameters), a main program, and the like from the hard disk 403, and performs an initialization process.

An SDRAM 404 temporarily stores print data expanded by the control unit 402. In response to a shift to the deep sleep state to be described later, the SDRAM 404 temporarily saves initialization data and setting data loaded from the hard disk 403 in the initialization process.

Each part of the image processing control unit 401 uses again the saved initialization data and setting data when returning from the deep sleep state. This allows high-speed return when turning on each part again.

A DDR-SDRAM, SRAM, or the like may replace the SDRAM 404. In general, a volatile storage medium is higher in data read/write speed than a nonvolatile storage medium such as a hard disk, EEPROM, or flash memory. The volatile storage medium is desirably applied instead of the SDRAM 404. Especially when the program data size is large, the hard disk 403 must store a program under limitations of the data size of the ROM. In this case, the volatile storage medium is effectively used instead of the SDRAM 404 for a higher data read/write speed.

The deep sleep state in the first embodiment will be explained.

When the image processing control unit 401 does not detect any interrupt signal for a predetermined time after the timer starts up, it applies continuous electric power from an electric power supply unit 414 to a minimum part necessary for reception and processing of print data, and return from a state in which the image processing control unit 401 cannot respond to any status request.

The image processing control unit 401 inhibits application of electric power to the remaining functional blocks. To the contrary, the image processing control unit 401 applies continuous electric power to the SDRAM 404, an operation display unit 408, an expansion interface 412, the LAN controller 410, a network interface 409, an electric power switch circuit 417, and the like.

The operation display unit 408 receives electric power from a continuous electric power supply 415 to allow the user to confirm the status of the printer including the image processing control unit 401 and change settings associated with various image processes. An activation signal (PME in FIG. 3) to return the image processing control unit 401 from the deep sleep state is issued in accordance with an operation to the operation display unit 408, which will be described in detail later. The PME stands for Electric Power Management Event, which is used to turn on the system. A system having a PCI2.2 bus can receive the PME. In the present invention, the activation signal is not limited to the PME, but may be an original instruction signal or another instruction signal as long as the signal can designate electric power supply.

The network interface (LAN I/F) 409 allows the printing apparatus 105 to communicate various data with a plurality of external apparatuses (e.g., the print server 101 and the clients 102 to 104). The network interface (LAN I/F) 409 can adopt, e.g., a 10/100BASE-T connector.

The LAN controller (LANC) 410 controls communication with an external apparatus via the network interface (LAN I/F) 409. The LAN controller 410 has a part (dotted-line part) which receives electric power from the continuous electric power supply 415, and a part (solid-line part) which receives electric power from a non-continuous electric power supply 416. In the deep sleep state, no electric power is supplied to the solid-line part which receives electric power from the non-continuous electric power supply 416. At this time, no electric power is supplied to the hard disk (HDD) 403, either.

The dotted-line part of the LAN controller 410 functions as a monitoring unit which monitors, in response to an inquiry via the LAN I/F 409, which pattern data (e.g., a packet shown in FIG. 4) among a plurality of patterns has been received. If any pattern is recognized as a result of monitoring by the monitoring unit, an activation signal is issued to return the control unit 402 from the deep sleep state. For example, for a status request, the requesting information processing apparatus outputs an ARP signal. The ARP signal is an example of patterns monitored by the LAN controller 410. The ARP stands for Address Resolution Protocol. Respective units including the control unit 402 and hard disk (HDD) 403 also return from the deep sleep state along with processes in FIGS. 7, 11A, and 13A (to be described later) by the information processing apparatus. Electric power may be supplied to the hard disk (HDD) 403 when an external information processing apparatus requests information stored in the hard disk (HDD) 403. Return of electric power supply to the hard disk (HDD) 403 may be limited to a case in which an information processing apparatus requests a process requiring return. Even in this case, the present invention can save electric power without greatly impairing the functions of the printing system.

A plurality of patterns are registered in a MAC ROM 411 and loaded into the LAN controller 410 in an initialization process. The MAC ROM 411 may receive electric power from the non-continuous electric power supply 416. A pattern registered in the MAC ROM 411 can also be set by the user via the operation display unit 408. A pattern registered in the MAC ROM 411 can also be set from a remote information processing apparatus (e.g., the print server 101 or the clients 102 to 104) via the network 106.

Figure 4:
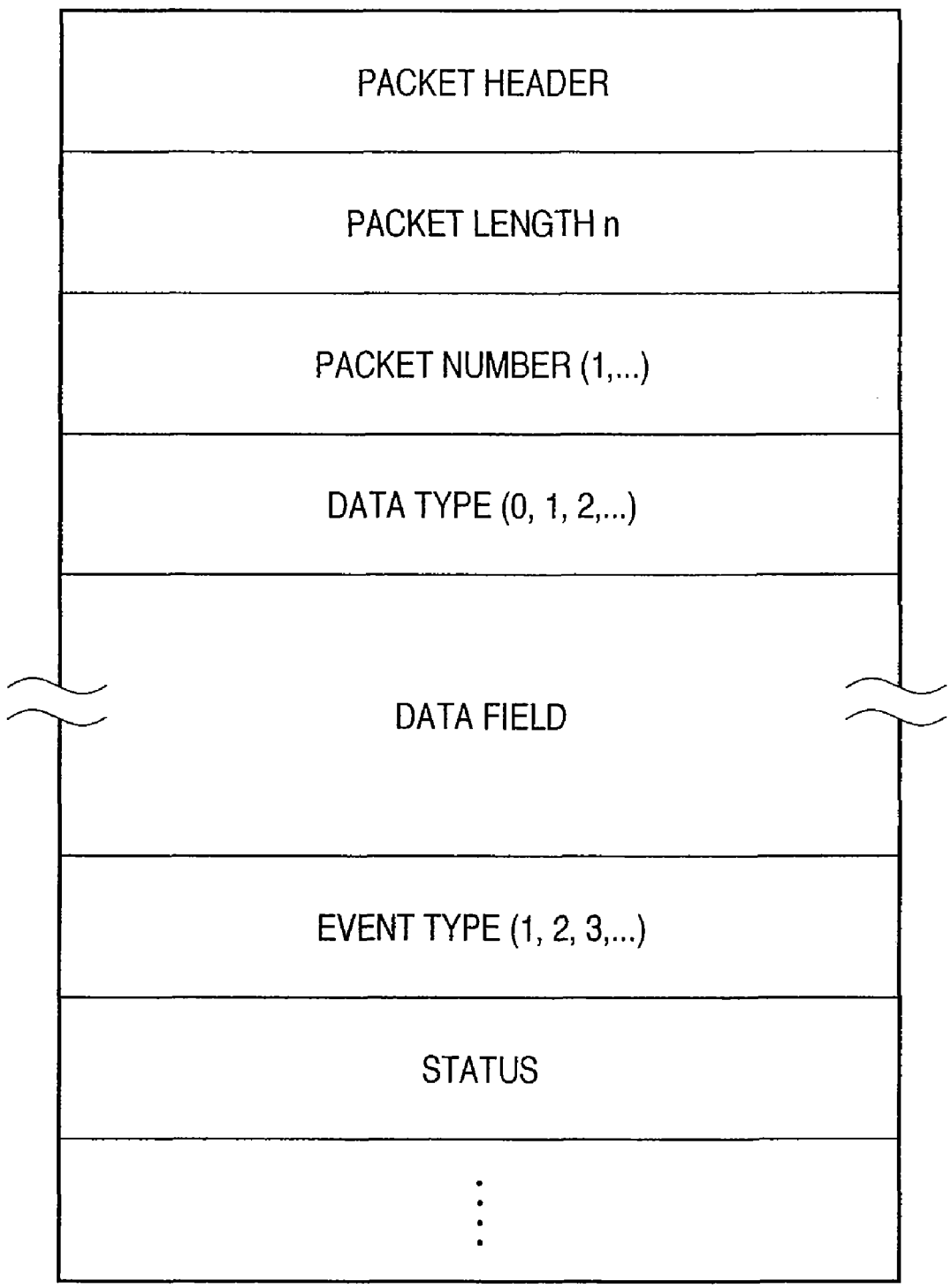
FIG. 4 is a view illustrating packet data exchanged between the information processing apparatus and the printing apparatus.

FIG. 4 is a view illustrating packet data exchanged between the information processing apparatuses 101 to 104 and the printing apparatus 105. The packet header holds a unique value representing the packet version or the like. The packet length represents the length of the packet, and the packet number is data having a unique arbitrary number. The data type holds data which specifies the type of data set in the data field. For example, "0" means a job, "1" means a command, and "2" means an event. The data field stores data corresponding to the data type. For example, when the data type represents a print job, the data field stores print data.

When the data type represents an event, the data field stores information which specifies an event type (1, 2, 3, 4, . . . ) For example, "1" means a job status change, "2" means a device status change, "3" means a user event, and "4" means a status change notice or the like.

The status field holds a device status (normal mode, electric power saving mode, sleep mode, or error) changed or to be changed, details of the device status, a factor which causes the status change, and the like. For example, "21" is set as data representing that the device status is the normal mode. "22" is set as data representing a notice to shift to the electric power saving mode. "23" is set as data representing the sleep notice mode. "29" is set as data representing that the device status is the error state. The sleep mode means, e.g., the above-described deep sleep state. The electric power saving mode means a state in which electric power is supplied to the image processing control unit 401 and electric power in the printer engine is saved.

Figure 5:
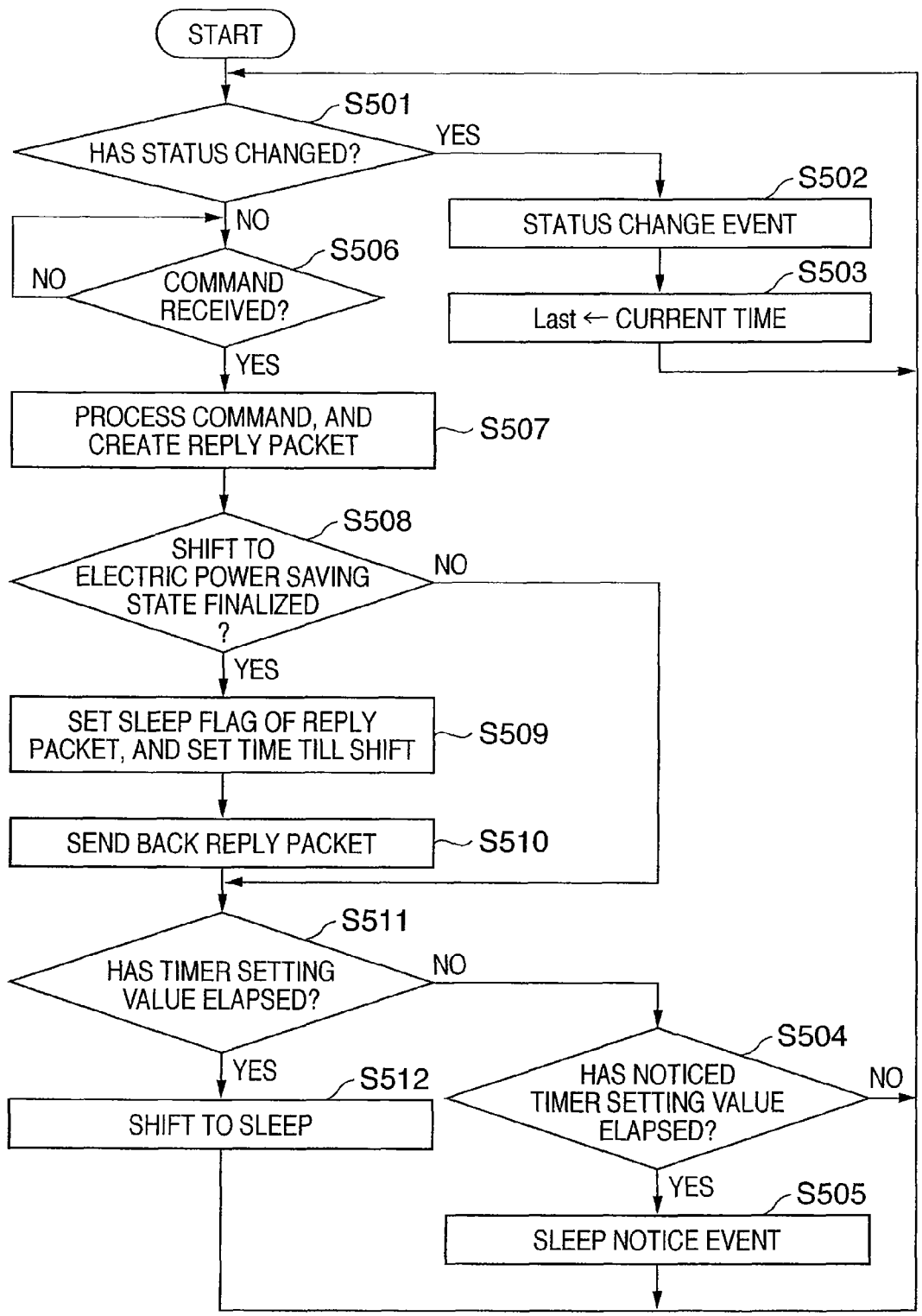
FIG. 5 is a flowchart for explaining a process sequence to shift to the electric power saving state in the printing apparatus according to the first embodiment.

A process sequence to shift to the electric power saving state in the printing apparatus 105 will be explained with reference to the flowchart of FIG. 5. This process is executed under the control of the controller unit which implements the functions of the printing apparatus 105.

In step S501, the controller unit of the printing apparatus 105 determines whether a status change such as a sheet absence error or a change of the operating mode has occurred. If the controller unit determines that a status change has occurred (YES in S501), it creates a packet as shown in FIG. 4 in step S502. At this time, the controller unit sets data ("2") representing a device status change in the data type, and sets information of a predetermined format representing a status change in the data field of the packet. Under the control of the controller unit, the created packet is transmitted to the information processing apparatuses 101 to 104 via the LAN I/F 409.

In step S503, the controller unit acquires the current time from an internal clock generator 420, and saves it as a latest status change time Last in an area allocated in the storage device such as the HDD 403. The process returns to step S501 to repeat the same process.

If the controller unit determines in step S501 that no status change has occurred (NO in S501), the process advances to step S506.

In step S506, the controller unit waits for reception of a command packet addressed to the printing apparatus 105. If the controller unit receives the command packet (YES in S506), it extracts command data from the packet and performs a process in step S507. The controller unit creates a reply packet to send back the process result.

In step S508, the controller unit determines whether shift of the printing apparatus 105 to the electric power saving state is finalized. When the user presses a sleep button on the operation panel of the printing apparatus 105, shift to the electric power saving state is finalized to start a process to shift to this state. At this time, the time till shift to the electric power saving state is calculated, and data representing the time is updated in the memory by subtraction till the completion of shift. When the user presses the sleep button, the HDD 403 or the like stores a flag representing that shift to the electric power saving state is finalized. By checking this flag, the controller unit can determine that shift to the electric power saving state is finalized.

If the controller unit determines in step S508 that no shift to the electric power saving state is finalized (NO in S508), the process advances to step S511. If the controller unit determines in step S508 that shift to the electric power saving state is finalized (YES in S508), the process advances to step S509.

In step S509, the controller unit sets, in the reply header of the created reply packet, a sleep flag representing that shift of the printing apparatus 105 to the electric power saving state is finalized, and the time until shift to the electric power saving state.

In step S510, the reply packet is sent back as a notice to the command source information processing apparatus under the control of the controller unit.

In step S511, the controller unit checks the lapse of a timer setting value. That is, the controller unit calculates the difference between the time saved as latest status change time Last and the current time acquired from the clock generator 420. The controller unit determines whether the value obtained by calculation is equal to or larger than a preset/held timer setting value.

If the controller unit determines in step S511 that the value obtained by calculation is equal to or larger than the timer setting value (YES in S511), the process advances to step S512. In step S512, the controller unit shifts the printing apparatus 105 from the operating mode capable of printing to the electric power-saving sleep mode. Then, the process returns to step S501 to repeat the same process.

If the controller unit determines in step S511 that the value obtained by calculation is smaller than the timer setting value (NO in S511), the process advances to step S504. In step S504, the controller unit checks the lapse of a noticed timer setting value. That is, the controller unit calculates the difference between the time saved as latest status change time Last and the current time acquired from the clock generator 420. The controller unit determines whether the value obtained by calculation is equal to or larger than a preset/held noticed timer setting value (this setting value is smaller than the timer setting value used in step S511).

If the controller unit determines in step S504 that the value obtained by calculation is equal to or larger than the timer setting value (YES in S504), the process advances to step S505. In step S505, the controller unit creates a packet shown in FIG. 4. At this time, the controller unit sets data ("2") representing a device status change in the data type, and sets information of a predetermined format representing a notice (sleep notice) to shift to the electric power saving state in the data field of the packet. Under the control of the controller unit, the created packet is transmitted to the information processing apparatuses 101 to 104 via the LAN I/F 409.

If the controller unit determines in step S504 that the value obtained by calculation is smaller than the timer setting value (NO in S504), the process returns to step S501 to repeat the same process.

Figure 6:
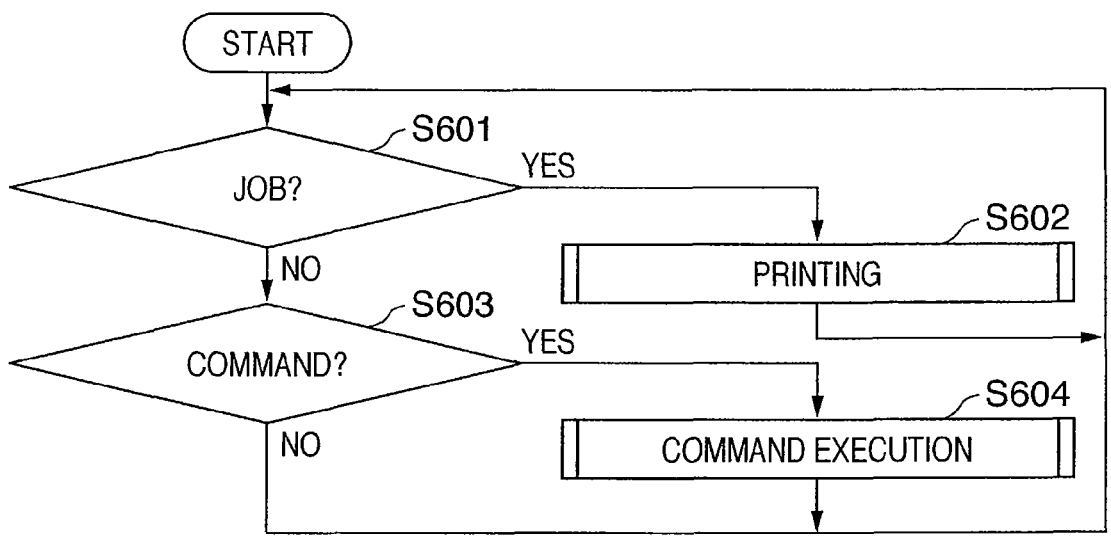
FIG. 6 is a flowchart for explaining the sequence of the basic operation of the printing apparatus according to the first embodiment.

The basic operation of the printing apparatus will be explained with reference to FIG. 6.

In step S601, the printing apparatus 105 receives and analyzes data transmitted from the information processing apparatuses 101 to 104 via the network 106. For example, when the data type of the packet shown in FIG. 4 is 0, the controller unit determines that the received data is a print job.

If the controller unit determines in step S601 that the received data is a print job (YES in S601), the printing apparatus 105 executes a print process based on a predetermined method in step S602. After the end of the print process, the process returns to step S601 to repeat the same process.

If the controller unit determines in step S601 that the received data is not print job data (NO in S601), the process advances to step S603, and the controller unit determines whether the received data is a command to execute a specifying process. For example, when the data type of the packet shown in FIG. 4 is 1, the controller unit determines that the received data is a command. The command includes acquisition of the print log, acquisition of a specific setting situation, and the like.

If the controller unit determines in step S603 that the received data is a command (YES in S603), the process advances to step S604. In step S604, the controller unit analyzes the data field of the received packet, and executes a process corresponding to the command (command execution). For example, when the command represents log acquisition, the controller unit of the printing apparatus 105 changes the print log held in the storage device such as the HDD 403 into a predetermined format, and transmits the print log to the information processing apparatus.

If the controller unit determines in step S603 that the received data is not a command (NO in S603), the process returns to step S601 to repeat the same process.

Figure 7:
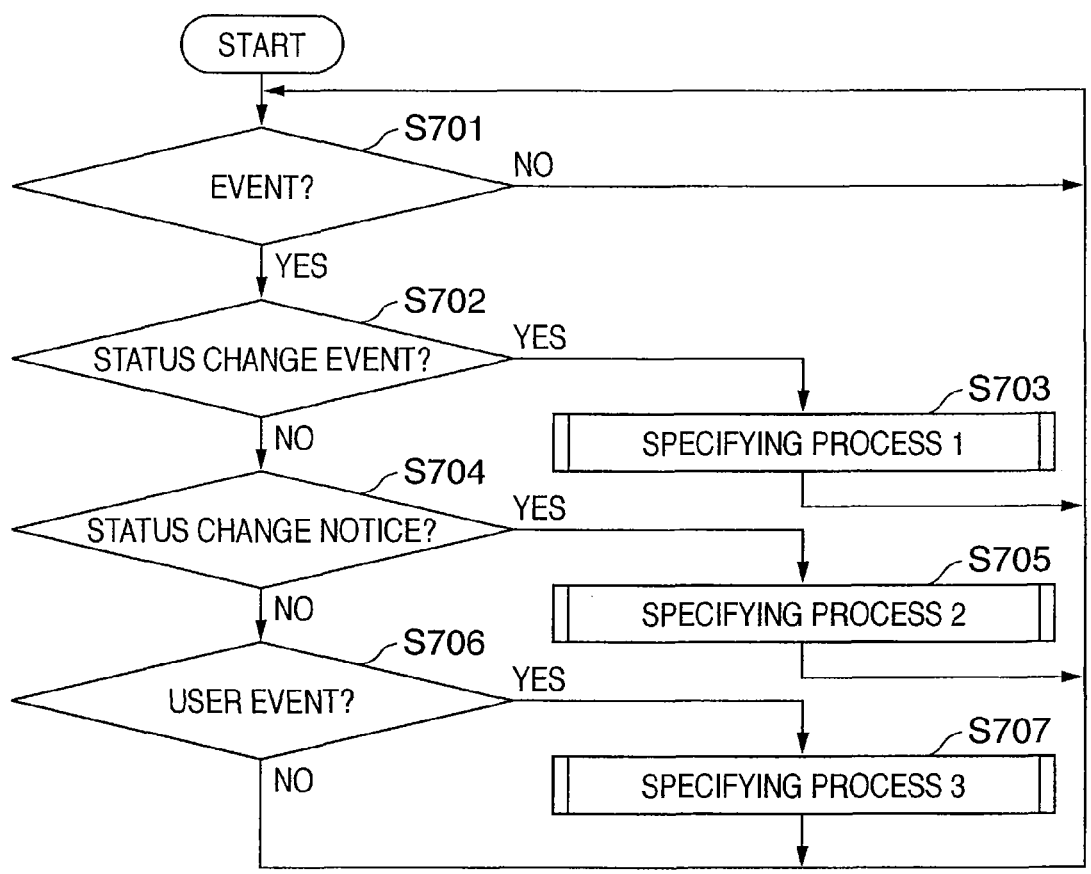
FIG. 7 is a flowchart for explaining the process sequence of an application executable in the information processing apparatus according to the first embodiment.

The process of an application executable in the information processing apparatuses 101 to 104 will be described with reference to FIG. 7. The information processing apparatuses 101 to 104 each acquire information (apparatus status information) representing the apparatus status from the printing apparatus 105, and display the status of the printing apparatus 105 on the display 207. "Printable", "during printing", "error", "offline", or the like is displayed as the status of the printing apparatus 105. A sheet absence error, sheet jam, or the like is displayed as a more detailed status. The user can cause the application to print by operating a built-in button or the like, and can recognize the status of the printing apparatus 105. The user can perform an operation associated with a print job (e.g., deletion, suspension, resume, surpass, or proxy), and the operation of the printing apparatus 105 (e.g., suspension, resume, offline, online, or initialization).

In step S701, the CPU 200 of the information processing apparatus analyzes packet data (see FIG. 4) received via the network 106 to determine the type of received data. If the type of received data is not an event (NO in S701), the process waits for reception of the next data.

If the CPU 200 determines in step S701 that, for example, data ("2") representing an event is set in the data type of the packet shown in FIG. 4, it determines that the type of received data is an event. If the type of received data is an event (YES in S701), the process advances to step S702.

If the CPU 200 determines in step S701 that the type of received data is an event, it analyzes the event type of received packet data to determine in step S702 whether the event type is a status change event. For example, when data ("2") representing a device status change is set in the event type of the packet shown in FIG. 4, the CPU 200 determines that the type of received data is a device status change event. If the CPU 200 determines in step S702 that the event type is the device status change event (YES in S702), the process advances to step S703 to perform a specifying process 1 (to be described later) suited to the device status change event determined in step S702. After the end of the specifying process 1, the process returns to step S701 to repeat the same process.

If the CPU 200 determines in step S702 that the event type is not the status change event (NO in S702), the process advances to step S704. The CPU 200 analyzes the event type of the packet to determine whether the event type is a status change notice event representing that the printing apparatus is due to shift from a first electric power state in which electric power necessary for a status response to an external request is supplied to a second electric power state in which no necessary electric power is supplied for the status response to the external request is supplied. For example, when data ("4") representing a status change notice is set in the event type of the packet shown in FIG. 4, the CPU 200 determines that the event type is the status change notice event representing that the printing apparatus is due to shift from the first electric power state to the second electric power state. If the CPU 200 determines in step S704 that the event type is the status change notice event (YES in S704), the process advances to step S705 to perform specifying process 2 (to be described later) suited to the status change notice event determined in step S704. After the end of a specifying process 2, the process returns to step S701 to repeat the same process.

If the CPU 200 determines in step S704 that the event type is not the status change notice event (NO in S704), the process advances to step S706. The CPU 200 analyzes the event type of the packet to determine whether the event type is a user event. For example, when data ("3") representing a user event is set in the event type of the packet shown in FIG. 4, the CPU 200 determines that the event type is the user event. If the CPU 200 determines in step S706 that the event type is the user event (YES in S706), the process advances to step S707 to perform a specifying process 3 suited to the user event determined in step S706. After the end of the specifying process 3, the process returns to step S701 to repeat the same process. If the CPU 200 determines in step S706 that the event type is not the user event (NO in S706), the process returns to step S701 to repeat the same process.

(Specifying Process 1 (S703 in FIG. 7))

Figure 8:
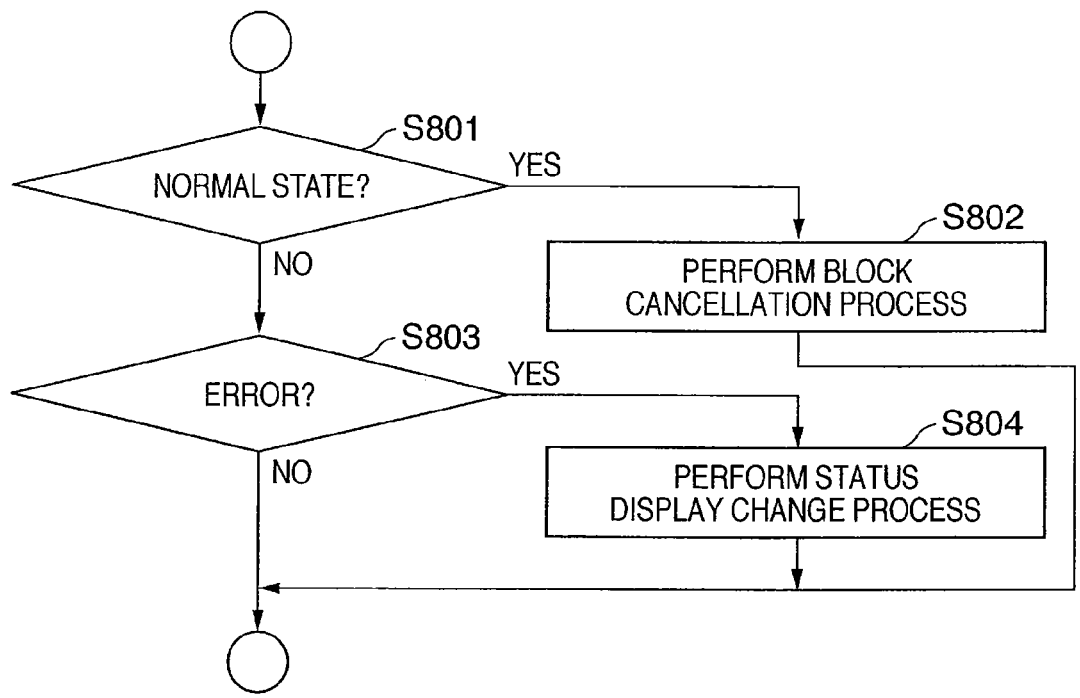
FIG. 8 is a flowchart for explaining the sequence of specifying process 1 in step S703 of FIG. 7.

The sequence of the specifying process 1 in step S703 of FIG. 7 will be described with reference to FIG. 8.

In step S801, the CPU 200 analyzes data stored in the packet status field to determine whether the printing apparatus 105 is in the normal state (normal mode). When data ("21") representing that the device status is the normal state (normal mode) is set in the status field, the CPU 200 determines that the printing apparatus 105 is in the normal state (YES in S801), and the process advances to step S802.

In step S802, the CPU 200 executes a block cancellation process. That is, the CPU 200 changes the status display of the printing apparatus 105 on the display 207 to "normal", and cancels operation limitations on application buttons and the like.

If the CPU 200 determines in step S801 that the printing apparatus 105 is not in the normal state (NO in S801), the process advances to step S803. In step S803, the CPU 200 analyzes data stored in the packet status field to determine whether the printing apparatus 105 is in the error state. When data ("29") representing that the device status is the error state is set in the status field, the CPU 200 determines that the printing apparatus 105 is in the error state (YES in S803), and the process advances to step S804. In step S804, the CPU 200 executes a status change process. That is, the CPU 200 changes the status display of the printing apparatus 105 on the display 207 to "error", and the process ends.

(Specifying Process 2 (S705 in FIG. 7))

Figure 9:
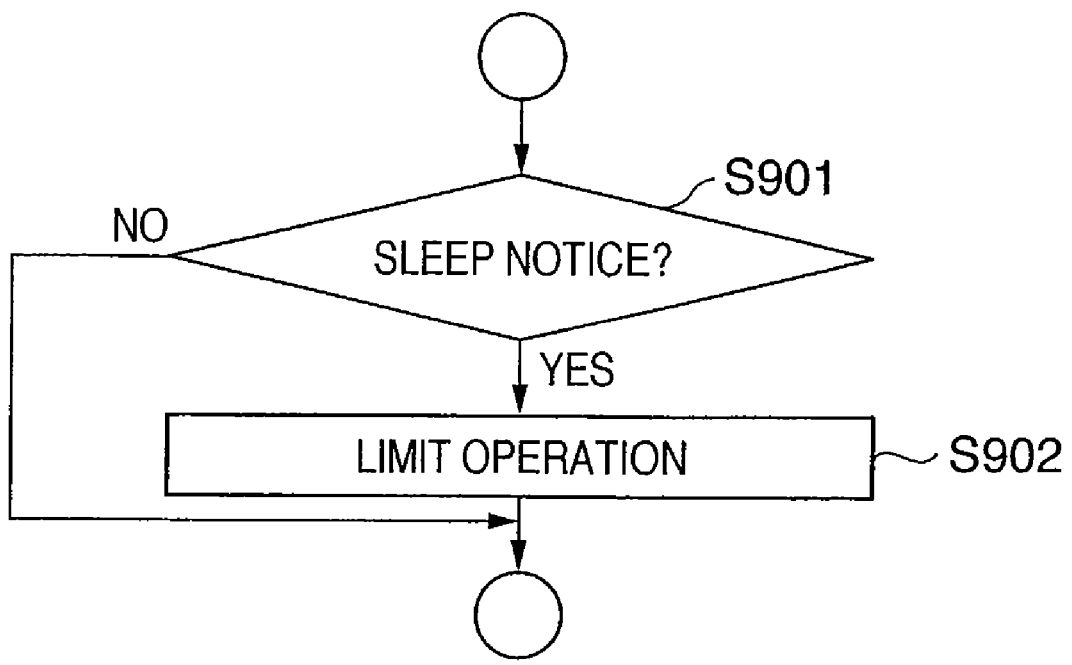
FIG. 9 is a flowchart for explaining the sequence of specifying process 2 in step S705 of FIG. 7.

A process sequence as the first example of specifying process 2 in step S705 of FIG. 7 will be described with reference to FIG. 9.

In step S901, the CPU 200 analyzes the packet status field to determine whether the device status is a sleep notice event representing that the printing apparatus is due to shift from the first electric power state to the second electric power state. If data stored in the status field is data ("23") representing the sleep notice (YES in S901), the CPU 200 determines that the status change notice is the sleep notice event.

In step S902, the CPU 200 executes an operation limitation process. That is, the CPU 200 changes the status display of the printing apparatus 105 on the display 207 to "during shift to sleep". The CPU 200 inhibits any operation to a job operation button, optional information acquisition button, and print instruction button of the application. Then, the process ends.

If the CPU 200 determines in step S901 that the device status is not the sleep notice event (NO in S901), the process skips step S902 and ends.

Figure 10:
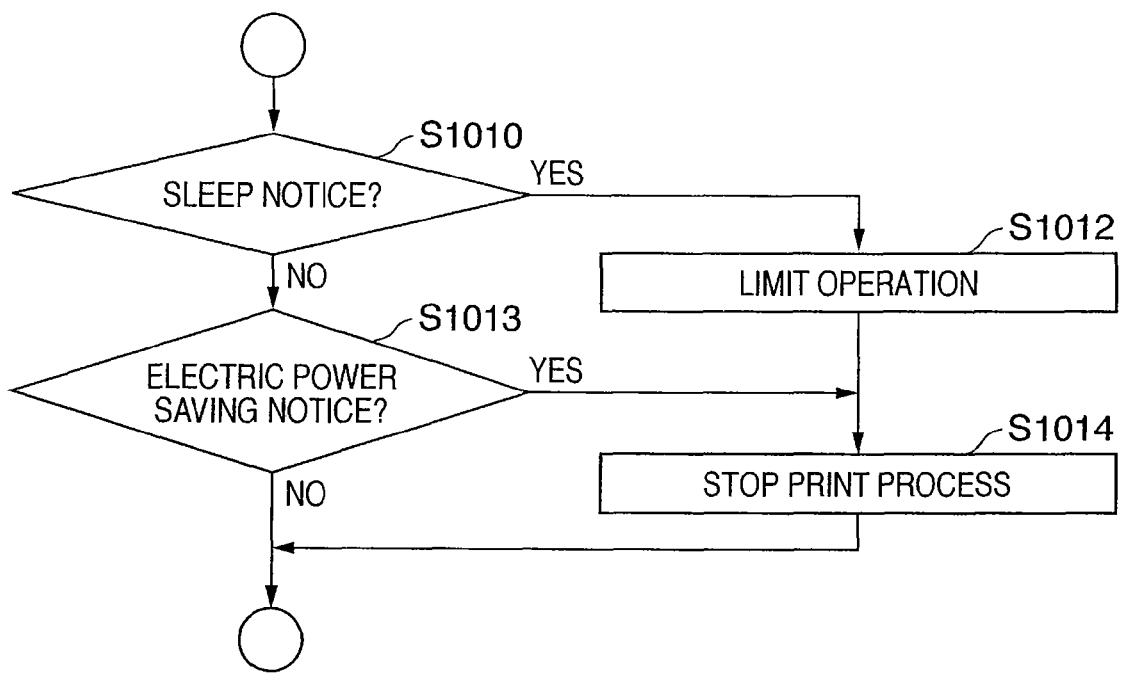
FIG. 10 is a flowchart for explaining another sequence of specifying process 2 in step S705 of FIG. 7.

A process sequence as the second example of the specifying process 2 in step S705 of FIG. 7 will be described with reference to FIG. 10.

In step S1010, the CPU 200 analyzes the packet status field to determine whether the device status is the sleep notice event. If data stored in the status field is data ("23") representing the sleep notice (YES in S1010), the CPU 200 determines that the status change notice is the sleep notice event.

If the CPU 200 determines that the status change notice is the sleep notice event (YES in S1010), it executes the operation limitation process in step S1012. That is, the CPU 200 changes the status display of the printing apparatus 105 on the display 207 to "during shift to sleep". The CPU 200 inhibits any operation to the job operation button, optional information acquisition button, and print instruction button of the application. Then, the process advances to step S1014.

If the CPU 200 determines in step S1010 that the status change notice is not the sleep notice event (NO in S1010), the process advances to step S1013. The CPU 200 determines whether the status change notice is a notice to shift to the electric power saving mode. If data stored in the status field of the packet is data ("22") representing the electric power saving mode shift notice representing that the printing apparatus is due to shift from the first electric power state in which electric power necessary for the status response to an external request is supplied to the second electric power state in which no necessary electric power is supplied for the status response to the external request is supplied, the CPU 200 determines that the status change notice is the electric power saving mode shift notice. Then, the process advances to step S1014.

In step S1014, the CPU 200 changes the status display of the printing apparatus 105 on the display 207 to "during shift to the electric power saving state". The CPU 200 inhibits any operation to the print button of the application. Then, the process ends.

Access to the printing apparatus is suppressed under the control of the CPU 200. The first embodiment can provide a technique capable of maintaining the idle state of the communication unit associated with communication control for a long time and saving electric power without greatly impairing the functions of the system.

Second Embodiment

Change of Application Start Timing

Figure 11A:
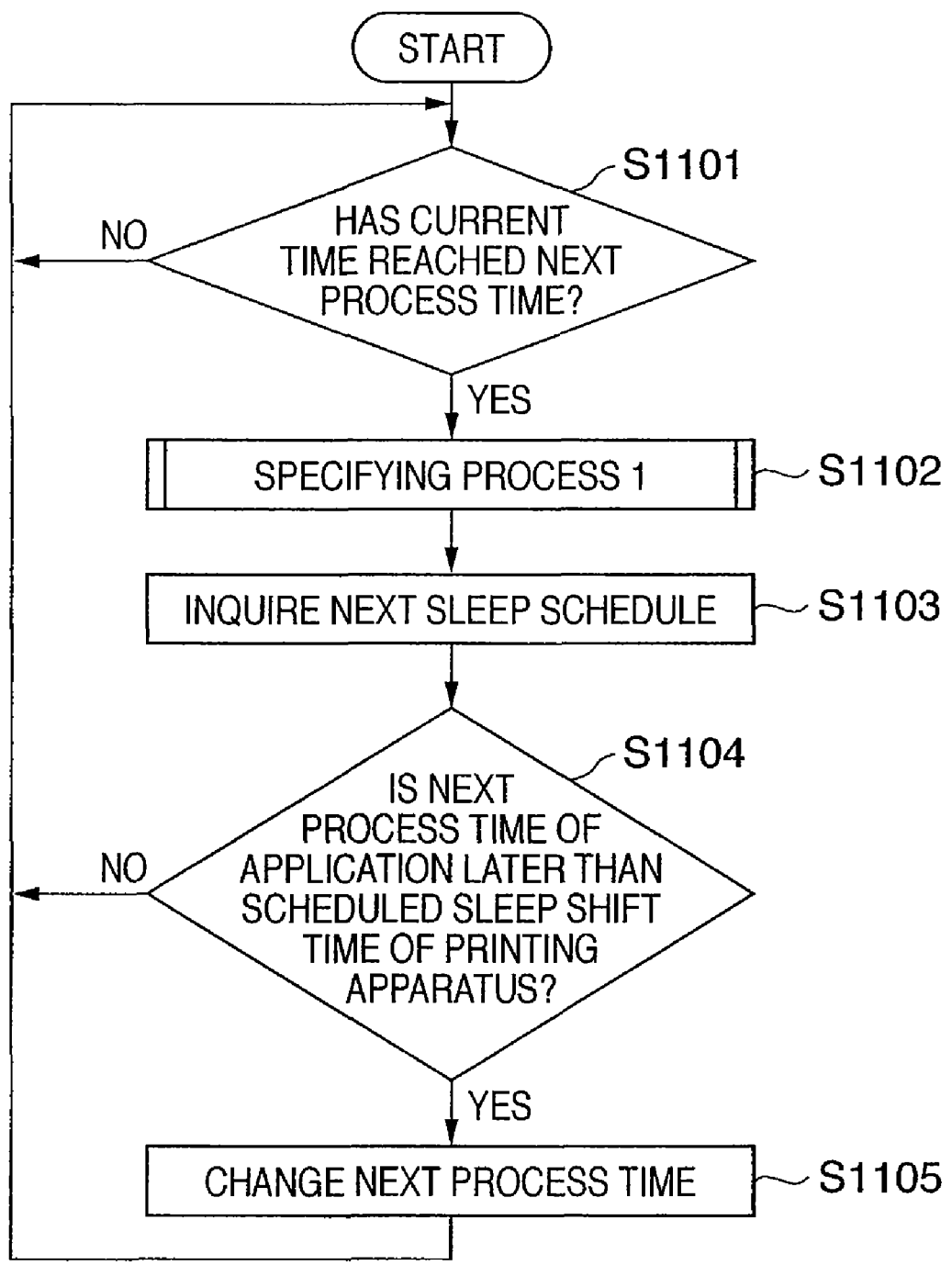
FIG. 11A is a flowchart for explaining the process sequence of an application executable in the information processing apparatus according to the second embodiment.

The relationship between shift of the status of a printing apparatus 105 and the application process in an information processing apparatus will be explained as the second embodiment of the present invention. FIG. 11A is a flowchart for explaining the process sequence of an application executable in each of information processing apparatuses 101 to 104. FIG. 11B is a table illustrating a state in which a RAM 202 or the like saves various times corresponding to processes (specifying processes 1, 2, . . . ).

In step S1101, a CPU 200 acquires the current time from a timer 215, and compares it with process start timing t0 saved in advance in the storage area such as the RAM 202. If the CPU 200 determines that the current time has not reached process start timing t0 (NO in S1101), step S1101 is repeated until the current time reaches process start time t0.

If the CPU 200 determines in step S1101 that the current time has reached process start timing t0 (YES in S1101), the process advances to step S1102 to perform a specifying process by the application (execution of specifying process 1). For example, the specifying process includes inquiry of the remaining sheet amount in the printing apparatus 105, and execution of a print process.

In step S1103, the CPU 200 inquires, of the printing apparatus 105, the schedule of entering the electric power saving mode (sleep mode) next time. For example, the CPU 200 creates a command packet in which data ("1") representing a command is set in the data type of the packet shown in FIG. 4 and data inquiring the sleep schedule is set in the data field. The CPU 200 transmits the command packet to the printing apparatus 105 via a network 106.

Upon reception of the sleep schedule inquiry, the printing apparatus 105 extracts scheduled sleep shift time from the storage area such as an HDD 403 under the control of the controller unit. The printing apparatus 105 creates a response packet of a predetermined format, and sends it back to the sleep schedule-inquiring information processing apparatus via the network 106. The information processing apparatus saves, in a storage area allocated in the RAM 202 or the like, scheduled sleep shift time (scheduled sleep shift time ta corresponding to specifying process 1) sent back from the printing apparatus 105.

In step S1104, the CPU 200 acquires the current time from the timer 215, acquires the process repetition interval TT of the application corresponding to the specifying process 1 from an area allocated in the storage device such as the RAM 202, and calculates the next process time of the application. The CPU 200 compares the next process time of the application with scheduled sleep shift time ta sent back from the printing apparatus 105. That is, the CPU 200 determines whether a value (next process start timing of the application) obtained by adding the process repetition interval TT of the application to the current time is later than scheduled sleep shift time ta.

If the CPU 200 determines that the next process start time of the application is later than scheduled sleep shift time ta of the printing apparatus 105 (YES in S1104), the process advances to step S1105.

In step S1105, the CPU 200 changes the timing of access to the printing apparatus 105 from the preset timing (e.g., timing based on periodic polling) based on the sleep mode shift notice acquired from the printing apparatus 105. In this case, change of the access timing is discriminated from stop of access. Changing the access timing means setting the access timing earlier or later than the scheduled timing. The operation in S1105 will be described in more detail. The CPU 200 saves, in the storage area such as the RAM 202, a value tt2 obtained by subtracting a predetermined fixed time held by the application from scheduled sleep shift time ta of the printing apparatus 105. Based on time tt2, the CPU 200 changes next process time t2 of the application as the time when the application starts the next process (S1105). In consideration of the internal process of the application, data transmission, the internal process of the application, and the like, the fixed time is set in advance as a sufficient time until the printing apparatus 105 accepts a specifying process instruction after the application starts a specifying process.

If the CPU 200 determines in step S1104 that next process time of the application is earlier than scheduled sleep shift time ta of the printing apparatus, the process returns to step S1101 without changing preset next process time t2 of the application.

FIGS. 12A and 12B are timing charts when changing next process time t2 based on the process in FIG. 11A from the preset timing (e.g., timing based on periodic polling) upon acquiring the sleep mode shift notice from the printing apparatus 105. FIG. 12A is a timing chart before changing next process time t2, and FIG. 12B is a timing chart after changing the next process time from t2 to tt2.

In FIG. 12A, the application process starts from time t0 and ends at t1. After the lapse of the process repetition interval TT of the application, the next process starts at next process time t2. The printing apparatus 105 shifts to the idle state after the response 1 to the specifying process 1, and at scheduled sleep shift time ta, shifts to the sleep state (sleep mode). At time t2, the printing apparatus 105 shifts from the sleep mode to the operating state (operating mode) in order to respond to the specifying process 1. In this case, tsleep1 represents the sleep mode time.

In FIG. 12B, when the next process time of the application is later than scheduled sleep shift time ta, next process time t2 changes from scheduled sleep shift time ta to the value tt2 obtained by subtracting a predetermined fixed time held by the application. After the end of the second specifying process 1 (end time tfin), the printing apparatus 105 shifts to the sleep mode. During the sleep mode time tsleep2 in the printing apparatus 105, no interrupt is caused by repetition of the application process, so a time longer than the sleep mode time tsleep1 in FIG. 12A is ensured.

Figure 14:
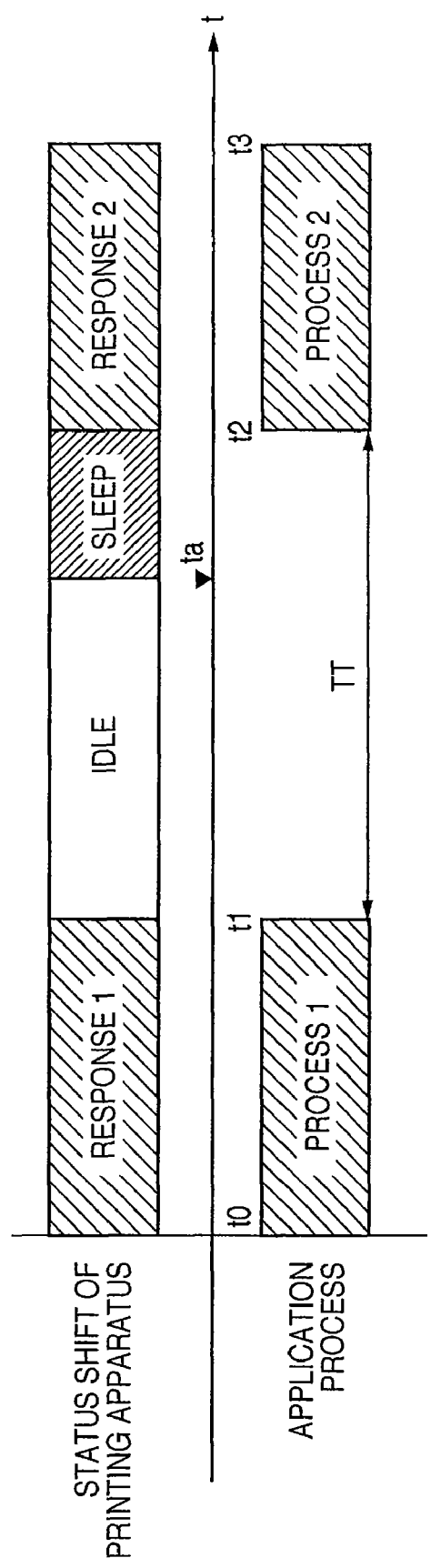
FIG. 14 is a timing chart showing the relationship between shift of a conventional printing apparatus to the operating mode and the process of an application.

By timing control to set the next process time earlier than the scheduled sleep shift time, the second embodiment can provide a technique capable of maintaining the idle state (corresponding to the above-mentioned deep sleep state) of the communication unit associated with communication control for a long time and further saving electric power without greatly impairing the functions of the printing system. For example, after the hard disk in the sleep mode (OFF) shifts to the operating mode (ON), the hard disk must remain ON for a predetermined time and require electric power supply for its operation for a predetermined period, as described with reference to FIG. 14. During this period, the hard disk cannot shift to the sleep mode. The technique of the second embodiment can solve this problem.

(Change of Application End Timing)

As a method of changing the operating mode of the printing apparatus 105, time is designated to forcibly change the operating mode at the designated time regardless of what kind of operation is in progress. For example, it is also possible to designate midnight, forcibly turn off the printing apparatus 105, and change it to the sleep mode. When the operating mode of the printing apparatus 105 is changed by this method, the application process results in an error unless the specifying process of the application ends before the scheduled operating mode change time. With reference to FIGS. 13A, 13B, 13C-1, and 13C-2, the second embodiment will explain timing control to set the specifying process end timing of the application earlier than scheduled operating mode change time of the printing apparatus 105. Shift from an operating mode capable of printing to the electric power-saving sleep mode will be described as an example of change of the operating mode. As for change of the operating mode, however, the basic premise of the present invention is not limited to this example.

Figure 13A:
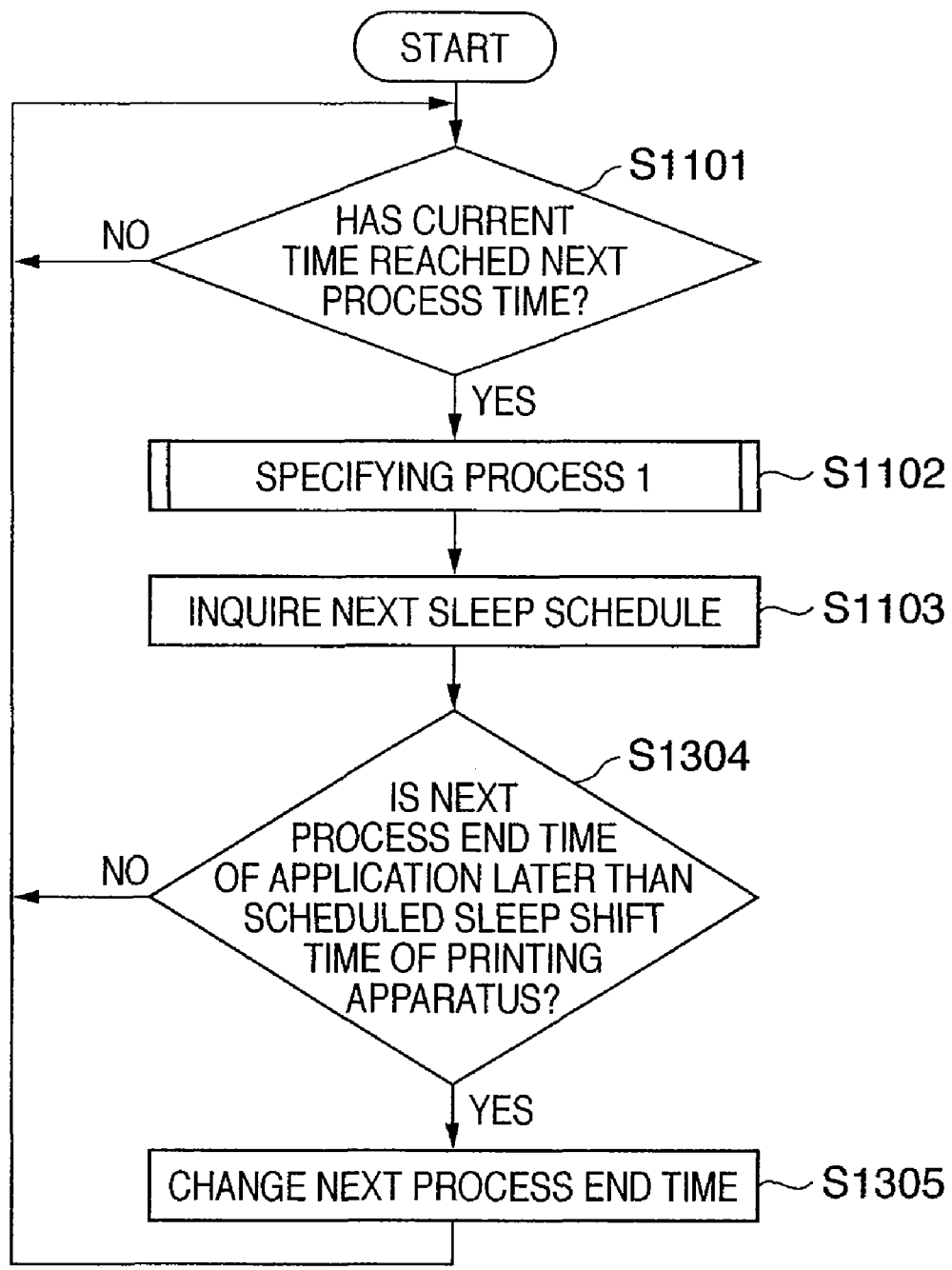
FIG. 13A is a flowchart for explaining the process sequence of an application executable in the information processing apparatus according to the second embodiment.

FIG. 13A is a flowchart for explaining the process sequence of an application executable in the information processing apparatuses 101 to 104. The same step numbers (S1101 to S1103) as those in FIG. 11A denote the same processes. FIG. 13B is a table illustrating a state in which the RAM 202 or the like saves various times corresponding to processes (specifying processes 1, 2, . . . ).

In step S1304, the CPU 200 acquires the current time from the timer 215, acquires the process repetition interval TT of the application corresponding to specifying process 1 from the RAM 202 or the like, and calculates next process time tt2 of the application. Next process time tt2 of the application is obtained by adding the process repetition interval TT of the application to the current time.

The CPU 200 calculates the next process end timing of the application by adding, to the next process time of the application, the time texe1 necessary to execute the specifying process 1. The application holds the time (texe1, texe2, . . . ) necessary to execute a process (specifying process 1, 2, . . . ), as a sufficient time until the application completes the process by a method such as advance measurement.

The CPU 200 compares the next process end timing of the application with scheduled sleep shift time ta sent back from the printing apparatus. That is, the CPU 200 determines whether the next process end timing of the application is later than scheduled sleep shift time ta. If the CPU 200 determines that the next process end timing of the application is later than scheduled sleep shift time ta of the printing apparatus 105 (YES in S1304), the process advances to step S1305.

In step S1305, the CPU 200 saves, in the RAM 202 or the like, a value tt3 obtained by subtracting, from scheduled sleep shift time ta of the printing apparatus 105, a fixed time held by the application and the time texe1 necessary to execute specifying process 1. Based on time tt3, the CPU 200 changes next process end timing t3 of the application as the time when the application ends the next process (S1305). In consideration of the internal process of the application, data transmission, the internal process of the application, and the like, the fixed time is set in advance as a sufficient time until the printing apparatus 105 accepts a specifying process instruction after the application starts a specifying process.

If the CPU 200 determines in step S1304 that the next process end timing of the application is earlier than scheduled sleep shift time ta of the printing apparatus, the process returns to step S1101 without changing preset next process end timing t3 of the application.

FIGS. 13C-1 and 13C-2 are timing charts when changing next process end timing t3 based on the process in FIG. 13A. FIG. 13C-1 is a timing chart before changing next process end timing t3, and FIG. 13C-2 is a timing chart after changing next process time from t3 to tt3.

In FIG. 13C-1, the application process starts from time t0 and ends at t1. After the lapse of the process repetition interval TT of the application, the next process starts at next process time t2. The printing apparatus 105 shifts to the idle state after the response 1 to specifying process 1. The printing apparatus 105 shifts to the sleep mode at scheduled sleep shift time ta before the completion of the response 2 to the specifying process 1 at time t2. In this case, the printing apparatus 105 shifts to the sleep mode before the completion of the response 2, so the specifying process 1 starting from time t2 reaches end time t3 before the completion of the response 2 (in this case, specifying process 1 results in an error).

In FIG. 13C-2, when next process end timing t3 is later than scheduled sleep shift time ta, next process end time t3 changes from scheduled sleep shift time ta to the value tt3 obtained by subtracting a fixed time and the execution time of specifying process 1 from scheduled sleep shift time ta.

The application starts the second specifying process 1 at next process time tt2, and ends it at next process end timing tt3. During this period, the time texe1 necessary for execution by the application is ensured. The printing apparatus 105 can complete response 2 to the second specifying process 1. After that, the printing apparatus 105 shifts to the idle state, and at time ta, shifts from the operating mode to the sleep mode.

By timing control to set next process end time earlier than the scheduled sleep shift time, the second embodiment can provide a technique capable of maintaining the idle state (corresponding to the above-mentioned deep sleep state) of the communication unit associated with communication control for a long time and further saving electric power without greatly impairing the functions of the printing system. For example, after the hard disk in the sleep mode (OFF) shifts to the operating mode (ON), the hard disk must remain ON for a predetermined time and requires electric power supply for its operation for a predetermined period, as described with reference to FIG. 14. During this period, the hard disk cannot shift to the sleep mode. The technique of the second embodiment can solve this problem.

Other Embodiment

The object of the present invention is also achieved by supplying a storage medium which stores software program codes for implementing the functions of the above-described embodiments to a system or apparatus. The object of the present invention is also achieved by reading out and executing the program codes stored in the storage medium by the computer (or the CPU or MPU) of the system or apparatus.

In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, nonvolatile memory card, and ROM.

The functions of the above-described embodiments are implemented when the computer executes the readout program codes. Also, the present invention includes a case in which an OS (Operating System) or the like running on the computer performs some or all of actual processes based on the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-110100 filed Apr. 12, 2006 and Japanese Patent Application No. 2007-067597 filed Mar. 15, 2007, which are hereby incorporated by reference herein in their entirety.

What is claimed is:

1. An information processing apparatus which can communicate with a printing apparatus that operates in a first electric power state in which electric power necessary for a status response to an external request is supplied and a second electric power state in which no necessary electric power is supplied for the status response to the external request is supplied, and which accesses the printing apparatus on the basis of a preset timing in order to cause the printing apparatus to perform a process, comprising:

an acquisition unit adapted to acquire a shift notice representing that the printing apparatus is due to shift from the first electric power state to the second electric power state and being transmitted from the printing apparatus which operates in the first electric power state; and a control unit adapted to access, when the acquisition unit acquires the shift notice, the printing apparatus by setting a timing of access to the printing apparatus earlier than the preset timing.

2. The apparatus according to claim 1, wherein said control unit controls the timing of access to the printing apparatus on the basis of the shift notice to the second electric power state that is acquired by said acquisition unit.

3. The apparatus according to claim 1, wherein said control unit changes a timing when the access starts, to be earlier than shift of the printing apparatus to the second electric power state on the basis of the shift notice to the second electric power state that is acquired by said acquisition unit.

4. The apparatus according to claim 1, wherein said control unit changes a timing when the access ends, to be earlier than shift of the printing apparatus to the second electric power state on the basis of the shift notice to the second electric power state that is acquired by said acquisition unit.

5. An information processing method for an information processing apparatus which can communicate with a printing apparatus that operates in a first electric power state in which electric power necessary for a status response to an external request is supplied and a second electric power state in which no necessary electric power is supplied for the status response to the external request is supplied, and which accesses the printing apparatus on the basis of a preset timing in order to cause the printing apparatus to perform a process, comprising:

an acquisition step of acquiring a shift notice representing that the printing apparatus is due to shift from the first electric power state to the second electric power state and being transmitted from the printing apparatus which operates in the first electric power state; and a control step of accessing, when the acquisition unit acquires the shift notice, the printing apparatus by setting a timing of access to the printing apparatus earlier than the preset timing.

6. The method according to claim 5, wherein in the control step, the timing of access to the printing apparatus is controlled on the basis of the shift notice to the second electric power state that is acquired in the acquisition step.

7. The method according to claim 5, wherein in the control step, a timing when the access starts is changed to be earlier than shift of the printing apparatus to the second electric power state on the basis of the shift notice to the second electric power state that is acquired in the acquisition step.

8. The method according to claim 5, wherein in the control step, a timing when the access ends is changed to be earlier than shift of the printing apparatus to the second electric power state on the basis of the shift notice to the second electric power state that is acquired in the acquisition step.

9. A computer program which is stored in a computer-readable medium and causes a computer to execute each step recited in an information processing method according to claim 5.

10. A computer-readable storage medium which stores a computer program defined in claim 9.

* * * * *